Patented Jan. 4, 1944

2,338,407

UNITED STATES PATENT OFFICE 2,338,407

PHOSPHORIC ACID MANUFACTURE

John H. Coleman, Warren Township, Somerset County, and Stephen G. Poll, Woodbridge, N. J., assignors to Westvaco Chlorine Products Corporation, New York, N. Y., a corporation of Delaware No Drawing. Application November 9, 1940, Serial No. 365,126

7 Claims. (Cl. 23—165)

This invention relates to phosphoric acid manufacture and intermediates therefor; and it comprises a phosphatic intermediate low in fluorine and adapted for the manufacture of phosphoric acid, such intermediate being a loose dry granular material corresponding in composition to an ordinary phosphatic ore but containing calcium pyrophosphate in lieu of orthophosphate, and being adapted to form, on treatment with sulfuric acid of suitable strength, a phosphoric acid of commercial concentration and a readily separable magma containing gangue and a form of calcium sulfate less hydrated than gypsum and of greater density and better filtrability; and it also comprises a method of preparing such an intermediate wherein a finely ground phosphate ore is intimately admixed with a phosphoric acid solution in amount sufficient to raise the ratio of total $P_2O_5$ and available CaO in the mixture to that corresponding to dicalcium pyrophosphate, and the mixture is heated to produce pyrophosphate with removal of water and gases containing fluorine, heating being at a relatively low temperature, usually around 270° C., and continued for about 30 minutes; and it further comprises a method of making phosphoric acid of high concentration and low fluorine content from ordinary phosphates with sulfuric acid, wherein raw phosphate is first converted into a dicalcium pyrophosphate by addition of phosphoric acid and heating to a low temperature to remove water and fluorine, and is thereafter acidified with sulfuric acid to produce phosphoric acid; all as more fully hereinafter set forth and as claimed.

Phosphoric acid and phosphates are made commercially from rock phosphate, apatite, pebble phosphate, etc., containing phosphoric acid in the form of an orthophosphate of calcium. These phosphate ores are impure materials and are sold on the basis of their content of tricalcium orthophosphate (bone phosphate). Marketable grades sometimes carry as high as 40 per cent gangue to only 60 per cent bone phosphate. Richer concentrates are available but there is always some gangue in commercial phosphate. The phosphate component usually carries fluorine in a combined form; it tends to the apatite type. The gangue often carries calcium carbonate and there is always more available CaO in the phosphate rock than corresponds to that of tricalcium phosphate, $3CaO:P_2O_5$. It is, however, convenient to call the phosphate contained in these phosphate ores tricalcium orthophosphate.

In the wet methods of opening up rock phosphates they are treated with sulfuric acid to displace phosphoric acid, wholly or partially. All the available calcium in the phosphate rock becomes calcium sulfate. Unless the sulfuric acid is diluted, the acid treated rock is a solid or pasty material. In making phosphoric acid for the market and for the production of sodium phosphates, the sulfuric acid is diluted enough to give a liquid phase which can be separated from the calcium sulfate (as gypsum) and gangue. This, however, results in dilute phosphoric acid which must be concentrated to give marketable material. Concentration is technically difficult because of the corrosive action of phosphoric acid on most structural material. From these mixtures made with dilute sulfuric acid, calcium sulfate separates as gypsum, $CaSO_4.2H_2O$. With stronger sulfuric acid acting on an orthophosphate gypsum may not result. Instead, there is a production of unstable sulfates carrying less water of crystallization and tending to take up water in washing. There are many difficulties in handling the magma of gangue and sulfate.

It is a discovery on which the present invention is in part based, that most of these troubles in handling disappear when pyrophosphate is used as a source of phosphoric acid in lieu of orthophosphate. The calcium sulfate is produced in a denser form much more readily handled and showing little tendency to take up water in washing.

In the operations of the present method a raw phosphate is first converted into dicalcium pyrophosphate, forming an intermediate, new commercially, and this intermediate is decomposed with sulfuric acid in the presence of enough water to make phosphoric acid of commercial concentration directly, thereby avoiding the necessity for evaporation. It is found that the calcium sulfate produced in this operation is dense and settles well and is easily washed. The over-all percentage of water of crystallization in the calcium sulfate in the magma separating is always considerably less than the 2:1 ratio of gypsum, $CaSO_4.2H_2O$, and usually is less than 0.5:1. The sulfates formed, however, do not tend to hydrate in washing. By using pyrophosphate as a starting material, with the usual expedients in recycling wash waters, it is possible to make directly marketable sirupy phosphoric acid of 50° Bé. or higher, whereas the product made in producing phosphoric acid from rock phosphate is rarely over 25 to 30° Bé.

The action of sulfuric acid on the pyrophosphate makes pyrophosphoric acid, but this quickly hydrates to orthophosphoric acid.

Phosphoric acid made directly from rock phosphate in the ordinary way is quite impure, carrying most of the iron, alumina and other acid soluble impurities of the original rock. Some of the fluorine of the rock goes off together with silica in acidification but there is always enough left in the phosphoric acid to be troublesome. Purification of phosphoric acid made directly from the orthophosphate is always troublesome. There are several filtrations and much recycling of liquids. The recoveries of $P_2O_5$ are not very good and the whole operation is costly.

In practical operations according to the present invention, recycled phosphoric acid is used for admixture with raw phosphate in making the pyrophosphate. Dilute washings can be utilized since the production of the pyrophosphate involves a heating operation in which water evaporates.

It is a discovery utilized in the present invention that tricalcium orthophosphate as it exists in ordinary phosphate rock, on admixture with the amount of phosphoric acid necessary to give an over-all ratio between available CaO and $P_2O_5$ corresponding to dicalcium pyrophosphate, on heating at moderate temperatures for a short time undergoes smooth conversion into pyrophosphate. Sufficient phosphoric acid is added to take care of all the lime; not only that in the phosphate but that existing as calcium fluoride, calcium carbonate, etc. Nearly all the fluorine goes forward with off-gases. It is combined with the orthophosphate and this combination is broken up in forming pyrophosphate. Ordinarily, 95 per cent or more of the contained fluorine goes forward in gaseous form when the orthophosphate is converted into pyrophosphate.

In conducting this process, it is advantageous to grind the phosphate rock at least fine enough so that about 95 per cent will pass through a 100-mesh screen. The phosphoric acid is then mixed with the finely ground rock in any suitable apparatus, such as one of the mixers commercially employed in making acid phosphate fertilizers. The acid may be pure orthophosphoric acid, or a crude acid, or a mixture of phosphoric acids, but it is desirable that it be sufficiently concentrated so that after mixing in the ratio indicated, the product is a granular free-flowing, readily handled material, thereby avoiding the necessity for a drying step preceding the heating. The mixture is heated in any suitable apparatus, such as an internally fired rotary furnace. This provides a sufficient amount of off-gases to carry away water and fluorine compounds. During heating, the temperature need not exceed 270° C., and only a very short heating period at this temperature is required; thirty minutes being ample to effect substantially complete conversion to dicalcium pyrophosphate. In an alternative procedure, the acid and unground raw rock are fed into a ball or pebble mill, in which the acid is thoroughly mixed with the rock simultaneously with the grinding thereof. This generally results in a somewhat finer product (for feeding to the heating stage) than the separate grinding and mixing steps previously described.

During the brief heating at 250° to 300° C., most of the fluorine contained in the original ore is eliminated. Tests have shown removal of more than 95 per cent of the fluorine contained in the original rock.

The fine dry powder of low fluorine content which is discharged from the rotary calciner contains the original gangue, and has most or all of its phosphate values in the form of dicalcium pyrophosphate. It is a new intermediate product which is highly useful in the manufacture of phosphoric acid and for other purposes. It is stable and may be stored for considerable time if desired; but it is often convenient to convert it immediately into phosphoric acid. For this purpose, it is conveniently charged into a tank having an acid-resistant lining, while it still carries the major portion of its stored heat from the calcining operation. In the acid-resistant tank, it is agitated with sulfuric acid, which may conveniently be cold acid of about 60° Bé. concentration. Acid of this concentration is stronger than that ordinarily employed in the prior processes and gives a high concentration of the phosphoric acid in the liquor obtained.

Usually, the 60° Bé. acid is diluted with washings and leachings from previous acidulated batches. The total water in a system should correspond to that wanted in the phosphoric acid, allowing for some disappearance of water in hydrating pyrophosphoric acid to orthophosphoric acid.

Agitation with the sulfuric acid is continued for about one to two hours using sufficient strong wash water from a previous batch to give the charge the desired consistency. During this time, crude pyrophosphoric acid having a density of about 50 to 55° Bé. is liberated, and calcium sulfate is precipitated. This calcium sulfate carries very little water of composition.

One of the advantages of this process of manufacturing phosphoric acid, and one of the advantages of using the new intermediate is, as stated, that the calcium sulfate precipitates largely in the form of a crystalline relatively stable material which is denser and contains less water of crystallization than gypsum. Nevertheless, it filters and washes readily, and does not set up in washing. Due to the density and characteristic structure of this precipitate, it is readily filtered and washed on a rotary drum filter, for example, with a minimum loss of $P_2O_5$ values; and the washing of this precipitate or filter cake requires the use of much smaller volumes of wash water than is the case when the sulfate is precipitated in forms generally obtained in prior processes.

The phosphoric acid produced by the stated reaction is initially pyrophosphoric acid, which readily reacts with the water present to form orthophosphoric acid. Even after the necessary wash water is added, however, the concentration of the acid is still sufficiently high for commercial purposes without resorting to evaporative concentration.

The crude orthophosphoric acid thus obtained may be used or sold as such, or may be purified or otherwise worked up as desired. It is convenient to return a portion of this acid to the first stage of the process, as the phosphoric acid to be used in converting orthophosphate to pyrophosphate. As a matter of calculation, one-third of the acid produced from the pyrophosphate on acidification should go back to the first step, together with enough excess to take care of the CaO combined otherwise than as phosphate. Any other phosphoric acid will do as well in making the pyrophosphate intermediate, but backcycling of the crude acid (and wash water from the filter cakes) is better practice.

When it is desired to purify the crude acid obtained in accordance with the method described, any suitable method of purification may be employed. In one embodiment of an especially useful method of purification described and claimed in a copending application, Serial No. 365,127, filed November 9, 1940, the crude acid is reacted with crude rock phosphate, or the pyrophosphate intermediate described hereinabove, to produce a complex calcium polyphosphate containing more P$_2$O$_5$ than monocalcium metaphosphate, such as the compound represented by the empirical formula Ca$_3$P$_8$O$_{23}$. This complex phosphate is treated with 66° sulfuric acid, and after heating for a short time, high purity phosphoric acid of high concentration may be readily recovered. As stated, however, various other methods of purification may be employed.

In a specific embodiment of the invention, rock phosphate ground to 95-mesh was mixed with crude phosphoric acid produced as described hereinabove, in a mixer of the acid phosphate type; the proportions being such that the resulting mixture contained available CaO and P$_2$O$_5$ in the dicalcium pyrophosphate ratio of 2:1. After thorough mixing, a fine granular free-flowing product was obtained. This was charged into an internally fired rotary kiln where the material was maintained at a temperature of approximately 270° C. for about 25 minutes. The material discharged from the calciner was the intermediate described hereinabove, having substantially all of its phosphatic values in the form of dicalcium pyrophosphate, and having a greatly reduced fluorine content.

While still hot, this calcium pyrophosphate intermediate was mixed with 60° sulfuric acid in the proportion of 2 mols H$_2$SO$_4$ for each mol of Ca$_2$P$_2$O$_7$, and with a sufficient quantity of 40° Bé. wash water from a previous batch to make a fluid slurry. After mixing for two hours, the suspension or slurry was filtered on a vacuum filter, and crude phosphoric acid having a density of 54° Bé. was recovered. The calcium sulfate was readily separated from the liquid phase, and so stable that the filter cake did not "set up" or cause other difficulties. The recovery of P$_2$O$_5$ was good. About 46 per cent of the phosphoric acid obtained in this way was back-cycled to produce a further quantity of pyrophosphate, and the remainder was otherwise utilized.

In some embodiments of the present invention, H$_2$SO$_4$ may be substituted for H$_3$PO$_4$ in the initial treatment of the raw phosphate to obtain a dicalcium pyrophosphate intermediate; and this procedure has many of the advantages described hereinabove.

By the term "rock phosphate" as used in the present specification and claims is meant raw phosphatic materials used in the manufacture of phosphoric acid such as apatite, phosphate rock, pebble phosphate and the like.

The term "available CaO" whenever used herein refers to calcium (computed as CaO) in a form reactive with the digesting acids in contradistinction to calcium that may be present in a form non-reactive with the digesting acids which must be considered as unavailable CaO therefore to be excluded in computing the ratio CaO:P$_2$O$_5$. For example, calcium silicate may be present in the phosphatic raw materials in a form not reactive with the digesting acid. Such calcium silicate will go forward and be discarded in what is called "gangue." Other acid insoluble compounds containing calcium in a form unavailable, such as calcium sulphate may also be present. If the calcium in these acid insoluble compounds is taken into consideration in calculating the CaO:P$_2$O$_5$ ratio it is obvious that an excessive amount of phosphoric acid would be used. Calcium present in "available" form will react with the sulfuric acid used and be removed as precipitated calcium sulphate.

What we claim is:

1. In the production of phosphoric acid, the process which comprises mixing a fluorine containing phosphate rock with phosphoric acid in an amount such that the ratio of the content of calcium calculated as CaO present in a chemical form reactive with phosphoric acid and sulfuric acid, to the P$_2$O$_5$ content in the mixture, is substantially 2:1, heating the mixture at a temperature of approximately 250° to 300° C. until the orthophosphate of the mixture is converted into pyrophosphate and substantially all of the fluorine is driven off, mixing the resultant material with sulfuric acid so that free phosphoric acid and a dense, readily filtering and settling magma containing gangue and stable calcium sulfate is formed, and filtering the material to recover strong phosphoric acid.

2. In the production of phosphoric acid, the process which comprises mixing a fluorine containing phosphate rock with a phosphoric acid in an amount such that the ratio of the content of calcium calculated as CaO present in a chemical form reactive with phosphoric acid and sulfuric acid, to the P$_2$O$_5$ content in the mixture, is substantially 2:1, heating the mixture at a temperature of approximately 250° to 300° C. until the orthophosphate of the mixture is converted into pyrophosphate and substantially all of the fluorine is driven off, mixing the resultant material with sulfuric acid so that free phosphoric acid and a dense, readily filtering and settling magma containing gangue and stable calcium sulfate is formed, and separating the phosphoric acid from the magma to recover strong phosphoric acid.

3. In the production of phosphoric acid, the process which comprises mixing a phosphate rock with phosphoric acid in an amount such that the ratio of the content of calcium calculated as CaO present in a chemical form reactive with phosphoric acid and sulfuric acid, to the P$_2$O$_5$ content in the mixture, is substantially 2:1, heating the mixture at a temperature of approximately 250° to 300° C. until the orthophosphate of the mixture is converted into pyrophosphate, mixing the resultant dry, granular material with strong sulfuric acid so that free phosphoric acid and a dense, readily filtering and settling magma containing gangue and stable calcium sulfate is formed and separating the phosphoric acid from the magma to recover strong phosphoric acid.

4. In the production of phosphoric acid, the process which comprises mixing a fluorine containing phosphate rock with phosphoric acid in an amount such that the ratio of the content of calcium calculated as CaO present in a chemical form reactive with phosphoric acid and sulfuric acid, to the P$_2$O$_5$ content in the mixture, is substantially 2:1, heating the mixture at a temperature of approximately 250° to 300° C. until the orthophosphate of the mixture is converted into pyrophosphate and substantially all of the fluorine is driven off, mixing the resultant dry, granular material with strong sulfuric acid so that free phosphoric acid and a dense, readily filtering and settling magma containing gangue and stable calcium sulfate is formed and separating the phosphoric acid from the magma to recover strong phosphoric acid.

5. The process of claim 3 wherein the mixture is heated at a temperature of about 270° C.

6. The process as defined in claim 4 wherein a portion of the recovered phosphoric acid is back-cycled and admixed with a further quantity of finely divided rock phosphate and heated to produce a further quantity of intermediate containing pyrophosphate.

7. In the production of phosphoric acid, the process which comprises mixing a fluorine containing phosphate rock with phosphoric acid in an amount such that the ratio of the content of calcium calculated as CaO present in a chemical form reactive with phosphoric acid and sulfuric acid, to the $P_2O_5$ content in the mixture, is substantially 2:1, heating the mixture at a temperature of approximately 250° to 300° C. until the orthophosphate of the mixture is converted into pyrophosphate, mixing the resultant material with sulfuric acid so that free phosphoric acid and a dense, readily filtering and settling magma containing gangue and stable calcium sulfate is formed, separating the phosphoric acid from the magma to recover strong phosphoric acid and repeating the foregoing process upon a fresh batch of phosphate ore using a portion of the recovered phosphoric acid for admixture with the ore in the initial step.

JOHN H. COLEMAN.
STEPHEN G. POLL.